J. B. MURRAY.
Improvement in Games.
No. 130,234.            Patented Aug. 6, 1872.
*Fig. 1.*            *Fig. 2.*
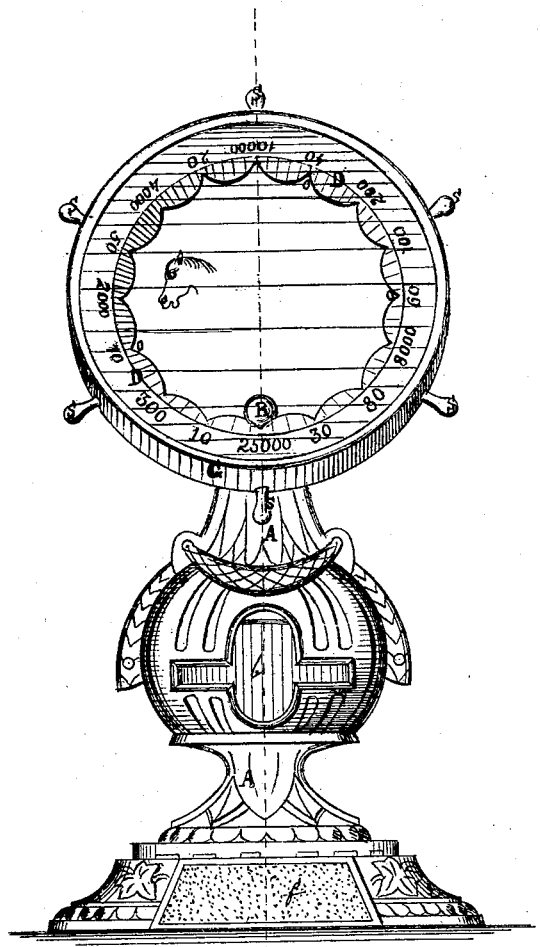
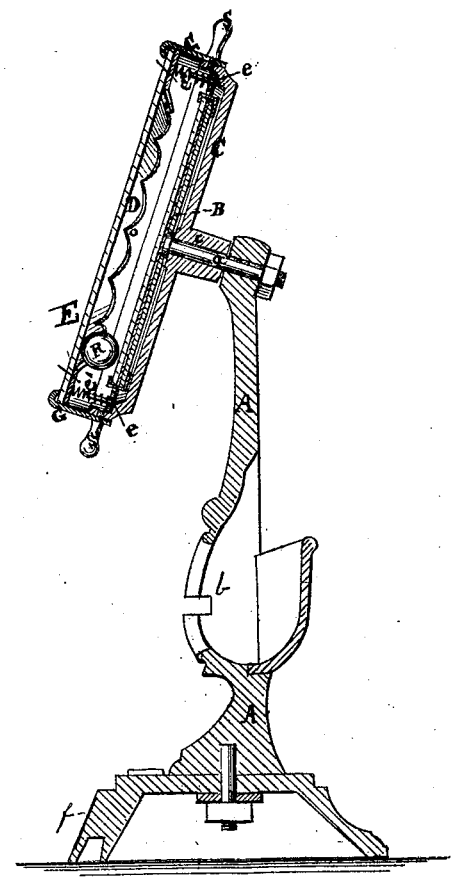
Witnesses:
Jas. B. Murray
           Inventor.
by his Attys

UNITED STATES PATENT OFFICE.

JAMES B. MURRAY, OF NEWARK, NEW JERSEY.

IMPROVEMENT IN GAMES.

Specification forming part of Letters Patent No. 130,234, dated August 6, 1872.

SPECIFICATION.

*To all whom it may concern:*

Be it known that I, JAMES B. MURRAY, of Newark, in the county of Essex and in the State of New Jersey, have invented a new and useful Improvement in Parlor Toys; and I do hereby declare that the following is a full, clear, and exact description thereof, reference being had to the accompanying drawing forming a part of this specification.

In the drawing, Figure 1 is a side elevation. Fig. 2 is a sectional view.

My invention consists in making a parlor toy, consisting principally of a revolving-wheel with a ball between two plates of glass, so arranged as to allow the ball to be caught in numbered notches as the wheel revolves; also a washer and spiral spring placed between the glass plates to regulate the space between wheel C and plate D, as desired, the wheel being pivoted on a suitable ornamental standard, as hereinafter described.

In the drawing, let A represent the cast-iron standard made of suitable ornamental shape, with a match-box and rubbing-surface, *f*, tray *b*, or inkstand. B is a metallic disk having a pivot, *a*, passing through the upper part of standard. On the front of this disk B is placed a picture protected by glass, (or a clock attachment may be applied instead of the picture.) C is the revolving wheel, made of metal, having a hub, *c*, which revolves on the fixed pivot *a*. D is the notched number-plate, having a series of scallops or notches, *o*, opposite a variety of numbers. This plate is provided with a washer, *e*, having spiral springs, which tend to keep the wheel C and plate D a suitable distance apart. E is the front glass plate. G is the confining-rim. When the several parts are placed together with the ball R between the two glass plates, the rim G is applied and secured in place by spokes S passing through it into the periphery of the wheel C.

The operation is as follows: By smartly turning the wheel with the spokes the wheel, consisting of the parts C D E G, revolves rapidly with the ball R. When the revolution ceases the ball will stop in one of the numbered notches. The object of the game may be to ascertain which of the players shall show the largest or smallest number.

By this improved construction, when the parts are nicely adjusted, I secure absolute "fair play" in an amusing parlor toy.

What I claim as my invention, and desire to secure by Letters Patent, is—

1. The collar or washer *e*, with springs *e'* attached between the glass plates, in combination with the wheel C, notched numbered plate D, plate E, rim G, and standard A, the whole constructed and arranged substantially as described, and for the purposes set forth.

2. In combination with standard A of my toy, as above described, the tray or match-box and rubbing-surface *f*, operating as and for the purposes set forth.

In testimony that I claim the above-described invention I have hereunto signed my name this 30th day of December, 1871.

J. B. MURRAY.

Witnesses:
MANN J. MERCHANT,
J. C. CLAYTON.